Patented Dec. 25, 1934

1,985,343

UNITED STATES PATENT OFFICE 1,985,343

PROCESS OF PRODUCING CATALYTIC MASSES

Gerald C. Connolly and Jeremiah A. Pierce, Baltimore, Md., assignors, by mesne assignments, to Chester F. Hockley, receiver for The Silica Gel Corporation, Baltimore, Md., a corporation of Maryland No Drawing. Application July 20, 1931, Serial No. 552,063. Renewed February 17, 1934

22 Claims. (Cl. 23—233)

The instant invention relates to methods of preparing catalytic masses composed of gel carriers impregnated with one or more catalytic materials.

More particularly, it is directed to the formation of hydrous oxide supported catalytic masses by incorporating a catalytic producing substance in a hydrous oxide sol, allowing said hydrous oxide to coagulate and converting said substance while distributed throughout the mass either wholly or partially into a catalytically active form by means of a reagent either already contained in the undried hydrous oxide or later added and diffused thereinto.

Sols suitable for use in the practice of the present invention include any hydrous oxide sol of a nature which will coagulate to form either a hydrogel or jelly, or mixture thereof, and which may be formed by drying into a hard porous adsorbent, usually a gel or gel-like material. The sol may be of an acid, neutral or alkaline character. A particularly suitable sol may be produced according to known methods by bringing together during agitation a solution of sodium silicate of a specific gravity of 1.15 to 1.22 and a solution of hydrochloric or other acid of about 10% strength. This sol coagulates or more specifically sets to a hydrogel within about four to five hours. In the preferred practice of the instant process, the catalytic producing substance is added to the sol at any time before the sol sets or coagulates, and the mixture is agitated to keep the substance evenly distributed throughout the sol until it has thickened sufficiently to prevent the substance from settling out. The duration of the agitation step may be reduced by adding the substance to the sol at a moment before it begins to thicken.

The catalytic producing substances employed may be metals, oxides (including other hydrous oxides) and insoluble salts, either normal or otherwise. These substances are preferably first reduced to a finely powdered condition. Usually, the finer the degree of subdivision, the greater the surface exposure of the catalytic substance formed therefrom will be in the carrier mass. Since catalytic activity of a mass of material is proportional to the available surface thereof, it is often advisable to reduce the metal or other substance to an extremely finely divided condition. Metals found suitable are zinc, iron, silver, chromium, aluminum, manganese, tin, calcium, nickel, etc. It is obvious that many other metals may be employed. Among the oxides are nickel sesquioxide, calcium oxide, cerium oxide, copper oxide, zinc oxide, tin oxide, etc. Suitable hydrous oxides include cuprous hydroxide, cupric hydroxide, manganese hydroxide, platinic hydroxide, etc. The salts which may be used include chromium chloride, cerium oxychloride, ferric acetate, lead chromate, manganous sulphide, zirconium oxalate, etc.

The quantity of the above substances to be employed depends entirely upon the use to which the product is to be put. It has been found that from 0.1 to 5.0% based on the dry product is satisfactory for most purposes.

The reagent used may be an acid such as sulphuric, hydrochloric, and nitric, an alkaline solution such as those of sodium, potassium, and ammonium hydroxides, and in certain cases a salt solution such as ammonium chloride.

The quantity of reagent employed depends upon one or more of the following conditions:
1. The amount of metal or other substance contained in the hydrous oxide.
2. The nature of the sol employed, as whether it is acid, neutral or alkaline.
3. The nature of the product desired.
4. The nature of the reagent used.

Where an acid sol has been employed and the quantity of metal or other substance added is comparatively small, it may be found that the acid already contained in the sol is sufficient to convert the substance into the desired active form. If this acid is insufficient, additional quantities of the same acid may be added to the mass. Preferably, the addition is made by soaking the hydrous oxide containing the metal or other substance in a weak solution of the acid. If the sol employed is neutral or alkaline, the quantity of acid necessary to complete the reaction must be greater than when the sol is already acid in character.

The instant process is suitable for the production of a catalytic mass containing more than one catalytic substance. This result may be accomplished by merely incorporating in the sol a catalytic substance capable of being converted into a different catalytic substance by treatment with a reagent in a quantity insufficient to completely react with the said substance in the sol. Alternatively, substantially the same result may be produced by soaking the coagulated hydrous oxide-catalytic substance mixture in the reagent for a time sufficient in duration for the conversion of only a part of the said substance into the different catalytic form.

The time of soaking in any case depends upon the concentration of the acid or other reagent employed. Where complete conversion of the catalytic producing substance is desired, it has been found that soaking for 12 to 24 hours in a normal solution of the acid is sufficient. During this period the acid completely diffuses throughout the hydrous oxide particles reacting with the substance incorporated therein.

Certain combinations of catalytic producing substances and reagents require some additional treatment to cause them to react. For instance, where chromium metal is to be reacted with acid, it is necessary to heat the mass either during or after the soaking operation.

After completion of the soaking step, the hydrous oxide is broken up into small pieces, if such is not already in that condition, and is washed to remove excess reagent together with any other soluble impurities present. If desired, the impregnated hydrous oxide may be washed before the treatment with the reagent. The hydrous oxide containing the catalytic substance is then dried or dried and activated in any suitable manner, such as by first drying in a stream of air at a temperature of 75° to 120° and later at a higher temperature of about 300° to 400° C.

In some instances, it may be necessary or expedient, in order to obtain the desired catalytic substance in the product, to treat the undried hydrous oxide containing the catalytic producing compound successively with two reagents. For instance, if it is desired to form a carrier impregnated with hydrated ferric oxide, the undried hydrous oxide containing finely divided iron distributed therethrough is first treated with an acid to convert the metal into a salt and then treated with a weak alkaline solution, whereby upon washing, drying and activating, a product containing the hydrated oxide is obtained. As an alternative to the alkaline treatment, a simple washing treatment to remove the chlorine ions may be employed, whereby iron is left in the form of its hydroxide.

In the preferred procedure under the instant invention, both the catalytic producing substances and the catalytic substances produced therefrom are insoluble materials. However, soluble catalytic producing substances may be employed, for instance, silver nitrate, zinc chloride, etc. Further, if the acid employed is nitric acid, a soluble nitrate will be formed. In this case, the impregnated hydrogel may be washed before it is treated with the acid to avoid dissolving out the active material.

The sols suitable for use in the instant process include those of the hydrous oxides of silicon, tungsten, chromium, aluminum, titanium, tin, germanium, and zirconium.

In certain instances and in particular where the reaction product of the ingredients mixed together to form the hydrous oxide coagulates quickly or immediately, the catalytic producing substance may be introduced into one or more of the ingredients before the mixing operation is begun; or the catalytic producing substance and the ingredients may be all mixed together simultaneously. These embodiments of the invention are limited to the use of those catalytic producing materials of a nature which will not be reacted upon by the chemical ingredients in such manner as to defeat the subsequent treatment of the mass with the reagent to convert the catalytic producing substance into the catalytically active form.

*Example 1*

A sol of silica is formed in any suitable manner, or by the method hereinbefore described. A few minutes before the sol begins to thicken, finely powdered zinc metal in a quantity of about 0.001 to 0.1% to the weight of the sol is added with vigorous stirring which is continued until the sol has thickened sufficient to prevent the settling out of said metal. The sol-metal mixture is then allowed to set to a hydrogel, after which a washing operation is preferably effected. This hydrogel mixture is soaked for from 12 to 24 hours in a normal $H_2SO_4$ solution in a quantity a little larger than theoretically required to react with the zinc added, whereby said acid reacts with the zinc occluded in the gel, forming zinc sulphate. The resulting mass is then dried in any suitable manner, or as hereinbefore described. If desired the mass may be activated at a temperature sufficient to decompose the sulphate to the oxide.

*Example 2*

A sol is formed and zinc added as described in Example 1. The quantity of acid here employed is about one-half of the quantity theoretically required to react with the zinc. The soaking, washing and drying is effected as described above. The resulting mass is a highly porous gel having both zinc and zinc sulphate distributed therethrough.

*Example 3*

An acid sol of silica is formed by reacting a solution of sodium silicate of a specific gravity of about 1.15 with a 10% solution of HCl in substantially equal proportions. Just before the sol thickens, about 0.001 to 0.1% of powdered iron is added to the sol and the mass agitated until the sol has become quite viscous. The mass is then allowed to set to a hydrogel, and then thoroughly washed. After about 2 hours, it will be found that the acid contained in the sol has reacted with the added iron to form ferric chloride. The hydrogel-ferric chloride mixture is then dried as hereinbefore described.

*Example 4*

In Example 3, before drying, the hydrogel-chloride mixture is treated with a weak solution of NaOH whereby the iron salt is converted into hydrated ferric oxide. The hydrogel mass is then washed, dried and activated in the usual manner.

*Example 5*

A quantity of finely divided chromium metal is incorporated in a sol produced in any suitable manner. The sol is agitated and allowed to set to a hydrogel. The hydrogel-metal mixture is then treated with HCl and heated to a temperature of about 100° C. for about 24 hours whereby the metal is caused to react with the HCl. The mass is then washed, dried and activated in the usual manner.

As an alternate method of heating to cause reaction, the hydrogel may be washed at 100° C. at once; the reaction proceeding during the washing.

*Example 6*

Nickel sesquioxide in a quantity of about 0.01 to 0.2% by weight is mixed with a sol of silica just before it begins to thicken. When the sol has set to a hydrogel, the hydrogel-oxide mixture is thoroughly washed, whereupon, it is soaked in a 1% to 10% solution of $NH_4OH$ for from 12 to 24 hours, forming nickel hydroxide within the mass of hydrogel. The resulting mass is then dried as described.

Example 7

Insoluble chromium chloride in a quantity of about 0.01 to 0.2% by weight is incorporated in a hydrogel in the manner described in Example 1. After a washing, the gel-salt mixture is soaked in a solution of chromous chloride, cuprous chloride or other mild reducing agent. The insoluble salt is thereby converted into the soluble form. The resulting mixture is then dried.

Example 8

In Example 7, before drying, the mixture is treated with an alkaline solution whereby the salt is converted into hydrous chromium oxide.

Example 9

A sol of titanium is formed by any suitable method and then is mixed with zinc, and otherwise treated in accordance with the process set out in Example 1.

The term "coagulate" employed herein and in the claims is used in its broadest sense and describes the congelation of hydrous oxides to form hydrogels, the agglomeration of hydrous oxides to form gelatinous masses and combinations of the same.

Having thus described the invention, what is claimed as new and desired to be secured by Letters Patent is:

1. The process of preparing a catalytic mass composed of a hydrous oxide carrier impregnated with at least one catalytic material which comprises forming a mixture of a hydrous oxide sol with a catalytic producing substance, allowing said sol to coagulate, and treating the coagulated mass with a reagent to convert the said substance into a catalytically active material.

2. The process of preparing a catalytic mass composed of a hydrous oxide carrier impregnated with at least one catalytic material which comprises mixing a catalytic producing substance with the ingredients employed in making a hydrous oxide sol, allowing said sol to coagulate, and treating the coagulated mass with a reagent to convert the said substance into a catalytically active material.

3. The process of preparing a catalytic mass composed of a hydrous oxide carrier impregnated with at least one catalytic material which comprises impregnating a hydrous oxide sol with a catalytic producing substance, allowing the sol to coagulate, and treating the coagulated mass with a reagent to convert the said substance into a catalytically active material.

4. The process of preparing a catalytic mass composed of a hydrous oxide carrier impregnated with at least one catalytic material which comprises adding a catalytic producing substance in a finely divided state to a hydrous oxide sol, agitating the mixture until it thickens sufficiently to prevent settling of said substance, allowing the sol to coagulate, and treating the coagulated mass to convert said substance into a catalytically active material.

5. The process of preparing a catalytic mass composed of a hydrous oxide carrier impregnated with at least one catalytic material which comprises mixing a catalytic producing substance with a hydrous oxide sol, allowing the sol to coagulate, contacting the coagulated mass with a reagent, and heating the mixture to cause the reagent to convert said substance into a catalytically active material.

6. The process of preparing a catalytic mass composed of a hydrous oxide carrier impregnated with at least one catalytic material which comprises mixing a catalytic producing substance with a hydrous oxide sol, allowing the sol to coagulate, treating the coagulated mass with a reagent in a quantity insufficient to react with all of said substance to thereby convert only a part of the substance into a catalytically active material.

7. The process of preparing a catalytic mass composed of a hydrous oxide carrier impregnated with at least one catalytic material which comprises incorporating a catalytic producing substance in an acid sol, said substance being of the type capable of forming a catalytic compound upon reaction with the acid in the sol, causing said substance and acid to react and form the catalytic compound, allowing the sol to coagulate, and drying the resulting gel mass.

8. The process of preparing a catalytic mass composed of a hydrous oxide carrier impregnated with at least one catalytic material which comprises incorporating a catalytic producing substance in an acid sol, said substance being of the type capable of forming a catalytic compound upon reaction with the acid in the sol, causing said substance and acid to react and form the catalytic compound, allowing the sol to coagulate, treating the coagulated mass with an additional quantity of the same acid present in the sol to convert the remaining portion of said substance into a catalytic compound, and drying the resulting mass.

9. The process of preparing a catalytic mass composed of a hydrous oxide carrier impregnated with at least one catalytic material which comprises incorporating a finely divided metal in an acid sol, causing said metal to react with the free acid in said sol to form a catalytically active compound of said metal, allowing the sol to coagulate, and drying the resulting impregnated gel mass.

10. The process of preparing a catalytic mass composed of a dried hydrous oxide carrier impregnated with at least one catalytic material comprising adding a finely divided metal to a hydrous oxide sol, allowing said hydrous oxide to coagulate, treating the mixture with an acid to convert said metal into an active salt of said metal and drying the resulting mass.

11. The process of preparing a catalytic mass composed of a dried hydrous oxide carrier impregnated with at least one catalytic material comprising adding a finely divided metal to a hydrous oxide sol, allowing said hydrous oxide to coagulate, reacting the metal incorporated in said oxide with a solution of a reagent to convert the metal into a catalytically active compound, and washing and drying the resulting mass.

12. The process of preparing a catalytic mass composed of a dried hydrous oxide carrier impregnated with at least one catalytic material comprising adding a finely divided metal to a sol of silica just before it begins to thicken, agitating the sol-metal mixture until the sol thickens sufficient to prevent settling of the metal particles, allowing said silica to coagulate, treating the silica-metal mixture with a reagent to convert said metal into a catalytically active compound, and drying the resulting mass.

13. The process of preparing a catalytic mass composed of a dried hydrous oxide carrier impregnated with at least one catalytic material comprising mixing a finely divided metal with a sol of silica, allowing said silica to coagulate, soaking said mixture in a dilute acid solution until said metal is converted into an active salt of said metal, washing the coagulated mass and drying the resulting product.

14. The process of preparing a catalytic mass composed of a hydrous oxide carrier impregnated with at least one catalytic material comprising adding a finely divided metal to a hydrous oxide sol, allowing said hydrous oxide to coagulate, treating the resulting mixture successively with an acid and an alkaline solution to convert said metal into a catalytically active compound.

15. The process of preparing a catalytic mass composed of a dried hydrous oxide carrier impregnated with at least one catalytic material comprising adding a finely divided metal oxide to a hydrous oxide sol, allowing said hydrous oxide to coagulate, treating the mixture with an alkaline solution to convert said metal oxide into a catalytically active compound, and drying the resulting mass.

16. The process of preparing a catalytic mass composed of a dried hydrous oxide carrier impregnated with at least one catalytic material comprising adding a finely divided metal oxide to a sol of silica, allowing said silica to coagulate, treating the mixture with an alkaline solution to convert said metal oxide into a catalytically active compound and drying the resulting mass.

17. The process in accordance with claim 16 wherein said metal oxide is an oxide of nickel.

18. The process of preparing a catalytic mass composed of a dried hydrous oxide carrier impregnated with at least one catalytic material comprising adding a finely divided insoluble salt to a hydrous oxide sol, allowing said hydrous oxide to coagulate, treating the mixture with a reducing agent to convert said salt into a catalytically active compound and drying the resulting mass.

19. The process of preparing a catalytic mass composed of a hydrous oxide carrier impregnated with at least one catalytic material comprising adding a finely divided insoluble salt to a sol of silica, allowing said silica to coagulate, treating the mixture with a reducing agent to convert said salt into a catalytically active compound and drying the resulting mass.

20. The process in accordance with claim 18 wherein the resulting mass prior to drying is treated with an alkaline solution, thereby converting the active salt into a hydrous oxide.

21. The process of preparing a catalytic mass composed of a hydrous oxide carrier impregnated with at least one catalytic material comprising adding finely divided insoluble chromium chloride to a hydrous oxide sol, allowing said hydrous oxide to coagulate, treating the mixture with a reducing agent, to convert said salt into soluble chromium chloride and drying the resulting mass.

22. A process in accordance with claim 9 wherein the sol is of silica.

GERALD C. CONNOLLY.
JEREMIAH A. PIERCE.